United States Patent
Gotesdyner et al.

(10) Patent No.: US 9,225,554 B2
(45) Date of Patent: Dec. 29, 2015

(54) DEVICE-HEALTH-BASED DYNAMIC CONFIGURATION OF NETWORK MANAGEMENT SYSTEMS SUITED FOR NETWORK OPERATIONS

(75) Inventors: Rony Gotesdyner, Sunnyvale, CA (US); Barry Bruins, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 162 days.

(21) Appl. No.: 13/178,386

(22) Filed: Jul. 7, 2011

(65) Prior Publication Data

US 2012/0191826 A1    Jul. 26, 2012

Related U.S. Application Data

(60) Provisional application No. 61/436,601, filed on Jan. 26, 2011.

(51) Int. Cl.
| | | |
|---|---|---|
| G06F 15/177 | (2006.01) | |
| H04L 12/64 | (2006.01) | |
| G06F 17/00 | (2006.01) | |
| G06F 3/12 | (2006.01) | |

(52) U.S. Cl.
CPC .......... *H04L 12/6418* (2013.01); *G06F 3/1254* (2013.01); *G06F 17/60* (2013.01)

(58) Field of Classification Search
USPC ....................................................... 709/221
See application file for complete search history.

(56) References Cited

U.S. PATENT DOCUMENTS

| | | | | |
|---|---|---|---|---|
| 4,634,110 A * | 1/1987 | Julich et al. ................ | 714/11 | |
| 6,031,528 A | 2/2000 | Langfahl, Jr. | | |
| 6,993,686 B1 * | 1/2006 | Groenendaal et al. ....... | 714/47.2 | |
| 7,143,153 B1 * | 11/2006 | Black et al. .................. | 709/223 | |
| 7,249,170 B2 * | 7/2007 | Tindal et al. ................. | 709/223 | |
| 7,299,276 B1 * | 11/2007 | Strawn ......................... | 709/224 | |
| 7,565,610 B2 | 7/2009 | Li et al. | | |
| 7,721,157 B2 | 5/2010 | Spitz et al. | | |
| 7,817,554 B2 * | 10/2010 | Skog et al. ................... | 370/235 | |
| 8,041,786 B2 * | 10/2011 | Tindal et al. ................. | 709/220 | |
| 8,156,207 B2 * | 4/2012 | Wood et al. .................. | 709/221 | |
| 8,316,113 B2 * | 11/2012 | Linden et al. ................ | 709/220 | |
| 8,320,388 B2 * | 11/2012 | Louati et al. ................. | 370/401 | |
| 8,429,535 B2 | 4/2013 | Gammon et al. | | |
| 2004/0075680 A1 | 4/2004 | Grace et al. | | |
| 2004/0139184 A1 * | 7/2004 | Bantz et al. .................. | 709/223 | |

(Continued)

OTHER PUBLICATIONS

U.S. Appl. No. 13/278,121, filed Oct. 20, 2011, Office Action, Aug. 1, 2013.

(Continued)

*Primary Examiner* — Hamza Algibhah
*Assistant Examiner* — James Edwards
(74) *Attorney, Agent, or Firm* — Hickman Palermo Becker Bingham LLP (57) ABSTRACT

In an embodiment, in response to receiving an indication of a change in quality of services provided by a network device, collecting one or more performance measurements of the network device; by applying a network policy to the measurements, determining one or more operations capable of performing on the network device to enhance the quality of services; in response to determining that the network device is not configured for instrumentation, causing automatic self-configuration of the network device by execution of the one or more operations on the network device; wherein the method is performed by one or more computing devices.

20 Claims, 5 Drawing Sheets

(56) References Cited

U.S. PATENT DOCUMENTS

| | | |
|---|---|---|
| 2005/0049832 A1 | 3/2005 | Gorinevsky |
| 2005/0198279 A1 | 9/2005 | Flocken et al. |
| 2008/0065756 A1 | 3/2008 | Hardwick et al. |
| 2008/0155423 A1 | 6/2008 | Moran et al. |
| 2008/0282104 A1 | 11/2008 | Khan |
| 2010/0159898 A1 | 6/2010 | Kryzanowski et al. |
| 2010/0162036 A1* | 6/2010 | Linden et al. .......... 714/4 |
| 2010/0229096 A1 | 9/2010 | Maiocco et al. |
| 2010/0275263 A1 | 10/2010 | Bennett et al. |
| 2010/0299419 A1* | 11/2010 | Ramankutty et al. ...... 709/221 |
| 2010/0318487 A1 | 12/2010 | Marvasti |
| 2011/0061051 A1 | 3/2011 | Haber et al. |
| 2011/0066898 A1 | 3/2011 | Mcrory et al. |
| 2011/0126111 A1 | 5/2011 | Gill et al. |
| 2011/0154208 A1 | 6/2011 | Horii |
| 2011/0208567 A9 | 8/2011 | Roddy et al. |
| 2012/0192016 A1 | 7/2012 | Gotesdyner |
| 2012/0192075 A1 | 7/2012 | Ebtekar |

OTHER PUBLICATIONS

U.S. Appl. No. 13/274,926, filed Oct. 17, 2011, Notice of Allowance, Feb. 18, 2014.

U.S. Appl. No. 13/278,121, filed on Oct. 20, 2011, Final Office Action, Jan. 27, 2014.

\* cited by examiner

DEVICE-HEALTH-BASED DYNAMIC CONFIGURATION OF NETWORK MANAGEMENT SYSTEMS SUITED FOR NETWORK OPERATIONS

PRIORITY CLAIM

This application claims the benefit under 35 U.S.C. 119(e) of provisional application 61/436,601, filed Jan. 26,2011, the entire contents of which are incorporated by this reference for all purposes as if fully set forth herein.

This application is related to U.S. patent application No Ser. 13/278,121, filed Oct. 20, 2011, entitled Integrated View Of Current, Recent And Historic Network Management Data Objects, by inventors Ali Ebtekar, David Digirolamo, Dustin Beltramo, Mark Shurtleff and Rony Gotesdyner.

This application is related to U.S. patent application Ser. No. 13/274,926, file Oct. 17, 2011, entitled Managing Network Devices Based on Predictions Of Events, by inventors Rony Gotesdyner, Mark Shurtleff, Ali Ebtekar and Barry Bruins.

TECHNICAL FIELD

The present disclosure is generally related to data communications between devices in a distributed network infrastructure, and specifically relates to troubleshooting of data communications problems in network devices and reconfiguring network devices to address the communications problems.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Some of features of internetworking devices that are deployed into production may be purposefully disabled. Such features may include non-critical and optional features that may useful only in certain situations. For example, a feature allowing monitoring data packets received from a particular node may not need to be enabled all the time. However, it may be beneficial to enable the monitoring feature when the particular node is malfunctioning. In such a situation, the monitoring feature may be activated and remain enabled until a network administrator completes troubleshooting the particular device.

One reason for non-critical features to remain temporarily disabled in a deployed network is to ensure the stability and reliability of the network. For example, in a standard configuration of a router in a deployed network, optional features of the router may be disabled to make the router's resources fully available to router's primary functions, such as routing data packets. Since the primary functions and optional features of the router often consume the same router's resources, such as CPU and memory, the standard instrumentation of the router often gives preferential treatment to the primary functions of the router and less favorable treatment to the router's optional features.

Enabling and disabling features in a deployed network is often a part of technical support activities and often involves reconfiguring devices in the network. However, since reconfiguring of a production network by a network administrator/technician may be prone to human error, and a defective reconfiguration of the production network may negatively impact the operation capabilities of the whole network, reconfiguration may be closely supervised. For example, a proposal of changes to the configuration may need to be reviewed and approved by a supervisor before the reconfiguration can be implemented. To ensure the correctness of the proposed changes, the approval process is often complex and time consuming, and thus it may take a long time to complete.

Consequently, for example, upon receiving a service call indicating a network's problem, a network administrator may need to draft and submit a proposal of the network modifications, and may run out of the time allotted to the service call before the proposal is actually approved.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
  1.0 General Overview
  2.0 Structural and Functional Overview
  3.0 Configuring a Network Device Using Health and Utilization Measurements
  4.0 Graphical User Interface Example
  5.0 Implementation Mechanisms—Hardware Overview
  6.0 Extensions and Alternatives
  1.0 General Overview In an embodiment, an approach for performing automated instrumentation of a network device based on information about device health and utilization is presented. The approach leverages knowledge about the health of the device to identify problems persistent on the device and to determine configuration modifications that, when executed, may cause elimination of the identified problems. The modifications are determined based, at least in part, on policies implemented in the network. Implementation of the modification does not require approval from a network management team or involve a significantly lighter approval process. The configuration modifications are determined in such a way that performing the modifications does not negatively impact the overall functionality of the network.

In an embodiment, information about device health includes any type of information that can be collected from and about the device and that pertains to a status of device components, applications, operational capabilities, errors and problems detected on the device, and any other information that could be used to determine an operational state of the device.

In an embodiment, information about device health can be collected at the time of receiving an indication that the device is malfunctioning. The device health information can also include historical data collected prior to detecting that the device is malfunctioning.

In an embodiment, information about a device health is collected for the device that has not been yet fully instrumented and deployed. The information may be used to determine the device configuration and the features that need to be enabled on the device before the device is deployed into production.

In an embodiment, information about device health is collected for the device that has been already instrumented and deployed. If the device has been already configured, the device health information is used to determine whether the device needs to be reconfigured, and if so, to determine the manner in which the device needs to be reconfigured.

In an embodiment, a method comprises collecting one or more performance measurements of a network device in response to receiving an indication of a change in quality of services provided by the network device.

In an embodiment, the performance measurements of the network device comprise health and utilization measurements, including any of: central processing unit (CPU) utilization status, memory utilization status, bandwidth status, load of the network device, a list of applications executed on the network device, an application response time, a link fault, a port fault, information communicated by an applications launched on the network device, or information communicated in data packets send from and to the network device.

In an embodiment, the indication of a change in quality of services is received from a system administrator, a program application or a user.

In an embodiment, a network policy is applied to the measurements to determine one or more operations capable of performing on the network device to enhance the quality of services are determined. In response to determining that the network device is not configured for instrumentation, automatic self-configuration of the network device is performed by executing the one or more operations on the network device.

In an embodiment, the method further comprises generating a network device health model and adding the device health model to a configuration of the network device.

In an embodiment, the method further comprises selecting the network policy based on a type and function of the network device.

In an embodiment, the method further comprises determining, based on the performance measurements, whether the network device has sufficient processing resources then-currently available to execute the one or more operations.

In an embodiment, the method further determines the device performance criteria and specifies utilization thresholds for the network device to determine the one or more operations if the device performance data fail to meet the utilization thresholds.

In an embodiment, the method further comprises using a trusted logic that is embedded in a network management module to determine the one or more operations capable of performing on the network device to enhance the quality of services.

In an embodiment, the one or more operations capable of performing on the network device to enhance the quality of services comprise any of the following: turning on a disabled feature on the network device for a particular period of time, turning off an enabled feature on the network device, enabling a network based application recognition capability, enabling a DPI analysis to recognize applications, enabling a device configuration analysis, enabling an application execution monitoring capability, enabling communications support, enabling a port on the network device, disabling a port on the network device.

In an embodiment, the method further comprises displaying, based, at least in part, on the measurements, a graphical user interface that comprises an indicator of whether the network device has sufficient processing resources available to perform the one or more operations. The graphical user interface may comprise one or more graphical user interface widgets that identify the one or more operations.

In an embodiment, the method further comprises receiving user input requesting activation of the one or more operations. Providing the requests and activation of the operations can be performed automatically.

In an embodiment, the method is performed by one or more computing devices.

In an embodiment, an internetworking device comprises one or more processors, a device health unit, a policy unit and an automatic self-configuration unit configured respectively to perform processes described herein.

In an embodiment, a non-transitory computer-readable storage medium stores one or more sequences of instructions which, when executed by one or more processors, cause the one or more processors to perform the processes described herein.

2.0 Structural and Functional Overview

In an embodiment, a method for automation of device instrumentation is based on the device health status and device utilization measurements collected in real time. Based on the device health status and utilization, device functionalities and features capable of performing on the device are determined. For example, if it is determined that the device health status sampled at a particular time allows the device to perform a DPI analysis of transmitted data packets in addition to the functions that the device is already performing, then the DPI analysis feature may be enabled automatically.

In an embodiment, a particular feature may be enabled for an indefinite period of time. For example, if it is determined that the device health status and utilization permit enabling a DPI analysis feature in addition to the functions that the device has been already performing, then the DPI analysis feature may be enabled for an indefinite period of time. If in the future, executing the DPI analysis feature starts negatively impact the device's health status and utilization, then the system may issue a notification reporting a degradation of the level of services provided by the device, and recommend disabling the DPI analysis feature.

In an embodiment, a particular feature may be enabled for a certain period of time. For example, upon determining the health status and device's utilization measurements collected at a particular time, the system may determine a time duration during which a DPI analysis feature may be enabled, enable the DPI analysis feature, set a timer with the time duration, and disable the DPI analysis feature upon expiration of the timer.

In an embodiment, the approaches described herein provide a method for instrumentation of a device by leveraging knowledge of the real-time health and utilization measurements of the device and by applying the network's specific policies to the measurement data. Device health and utilization measurements may include measurements that reflect device workload, status, operational state and other characteristics that can be sampled in a real time.

The approaches described herein allow reconfiguring a network device, or a multiplicity to devices, by enabling or disabling certain features on the device. Whether to enable or disable a particular future is determined based on the device's current utilization level, device characteristics sampled in a real time, policies implemented for the device, and determination whether enabling or disabling the particular feature is expected to negatively impact performance of the network as a whole.

In an embodiment, a health model of a device is generated based on the device's health and utilization data. For example, the health model may comprise the functions that the device is capable of performing, the status of the device's components, the features that are available on the device, the features that enabled on the device, the features that are disabled on the device, and any other information that can be useful in describing the device.

In an embodiment, device health and utilization data are combined with the device model data, and are analyzed to determine a performance level of the device. The device health and model data may be used to automate instrumentation or reconfiguration of the device. The device performance health and utilization data may accurately represent a then-current state of the device, and the device's model may accurately represent the then-current functionalities and type of the device. Therefore, the device's health and model information may be used to automate the process for determining the device's configuration/reconfiguration parameters and settings.

The approaches described herein allow instrumenting and reconfiguring a network device in an automated and efficient way, which permits bypassing an otherwise required, usually complex and procedurally difficult, reconfiguration-approval process.

In a conventional, production network, before a network device can be reconfigured, a proposal of the reconfiguration needs to be drafted and submitted to a supervising team, and reviewed by the team to ensure that the reconfiguration complies with the network policies and procedures and that the reconfiguration will not negatively impact performance of the network as a whole. Such a process is usually time consuming and complex.

Those and other problems described in the background section may be overcome by using the device's real time performance health, utilization data, the device models and network policies to automatically determine those reconfiguration schemes that are safe to perform on the device, and hence, that would not require receiving an approval from a supervising team.

For purposes of this disclosure, the term in real time means the time that is close to the time when a particular event occurred. For example, collecting real time performance data may be performed close to the time when a particular event occurred. Alternatively, collecting real time performance data may be performed continuously at all times and regardless of occurrence of the particular event.

Figure 1:
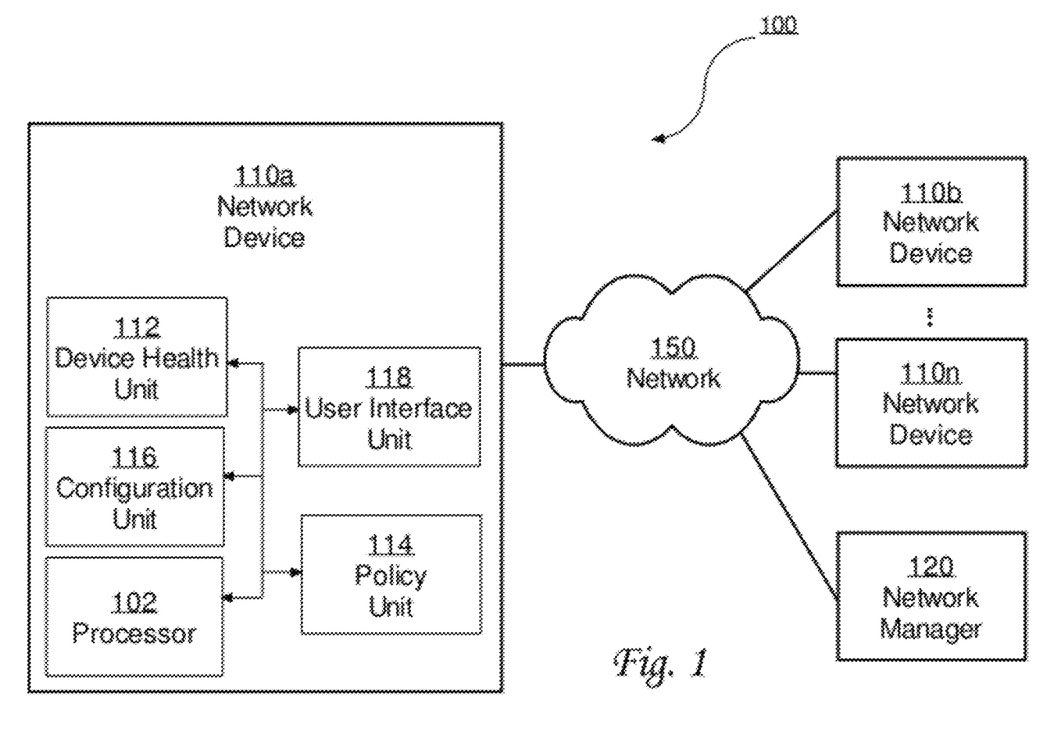
FIG. 1 illustrates an embodiment of a self-configuring network device.

FIG. 1 illustrates an embodiment of a self-configuring network device 110a in a data communications network 100. In an embodiment, network 100 is a packet-switched data network comprising a plurality of nodes, and the nodes comprise internetworking devices such as routers, switches, firewalls, gateways or other infrastructure elements; in some embodiments, the nodes may comprise computers or other endpoint devices.

In an embodiment, data communications network 100 comprises one or more network devices 110a through 110n, one or more sub-networks 150, and a network manager device 120. Network devices 110a through 110n, and network manager device 120 can be any type of a workstation, laptop, PDA device, phone, service, etc.

For purposes of illustrating clear examples, FIG. 1 shows network devices 110a, 110b, and 110n, one network manager device 120, and one sub-network 150. However, practical embodiments may use any number of network devices 110, network manager devices 120 and sub-networks 150.

In an embodiment, a sub-network 150 is communicatively coupled to network devices 110a, 110b through 110n, and network manager device 120.

In an embodiment, network devices 110a, 110b through 110n, network manager device 120 and sub-network 150 are configured to implement communications protocols, such as TCP or protocols other than TCP.

Network device 110a (110b through 110n), and network manager device 120 may implement the functional units that are shown within a network device, and the processes described herein, using hardware logic such as in an application-specific integrated circuit (ASIC), field-programmable gate array (FPGA), system-on-a-chip (SoC) or other combinations of hardware, firmware and/or software.

In an embodiment, network devices 110a, 110b through 110n, network manager device 120 and sub-network 150 comprise hardware or software logic configured to generate and maintain various types of communications session information, and routing information for data communications network 100.

In an embodiment, network device 110a comprises a processor 102, a device health unit 112, a policy unit 114, a configuration unit 116 and a user interface unit 118.

For purposes of illustrating clear examples, FIG. 1 shows that network device 110a comprises one processor 102, one device health unit 112, one policy unit 114, one configuration unit 116 and one user interface unit 118. However, in practical embodiments, each of network devices 110a, 110b through 110n comprises one or more processors 102, one or more device health units 112, one or more policy units 114, one or more configuration units 116 and one or more user interface units 118.

In an embodiment, a processor 102 facilitates communications between units of network device 110a, processes commands received by and executed on network device 110a, processes responses received by network device 110a, and facilitates various types of operations executed by network device 110a. Processor 102 comprises hardware and software logic configured to execute various processes on network device 110a.

In an embodiment, a device health unit 112 is configured to collect one or more performance measurements of network device 110a. The collection of the performance measurements may be triggered upon network device 110a receiving an indication of a change in a quality of services provided by network device 110a.

The indication may be received from a system administrator, a program application executed by network device 110a, a program application communicating with an application executed by network device 110a, from a user of network device 110a, or any other entity communicating with network device 110a. For example, a user who executes an application on network device 110a may notice a degradation of performance of one of the user's applications, and subsequently trigger sending an indication to device health unit 112 to collect performance measurements of network device 110a to determine the reasons for the performance degradation.

The users may also leverage other or additional performance measurements to understand the network application behavior. The additional measurements can be collected by various application probes and can be stored on other network devices.

In an embodiment, device health unit 110 collects various types of performance measurements for network device 110a. For example, the performance measurements may include the device's health and utilization measurements, such as the device's central processing unit (CPU) utilization status, memory utilization status, bandwidth status, load of the network device, a list of applications executed on the network device, an application response time, a link fault, a port fault, information communicated by an applications launched on the network device, information communicated in data packets send from and to the network device, or any other information that can reflect that status and utilization of network device 110a.

In an embodiment, the performance measurements may be collected from various diagnostic processes and applications hosted by network device 110a and/or network 100.

In an embodiment, a policy unit 114 is configured to receive the device's performance measurements for network device 110a and to retrieve one or more policies that are associated with network device 110a from storage associated with network device 110a and/or storage associated with network 100. For example, policy unit 114 may retrieve the policies that are implemented on network device 110a and the policies that regulate the manner in which the devices in network 100 communicate and cooperate with each other.

In an embodiment, policy unit 114 retrieves configuration information of network device 110a from configuration unit 116.

In an embodiment, configuration unit 116 is configured to collect and store configuration information of network device 110a. The configuration information may include the hardware and software configuration of network device 110a, hardware components of network device 110a, software application residing on network device 110a, information about communications session established via network device 110a, information about communications protocols that network device 110a implements, and any other information pertaining to settings and capabilities of network device 110a.

In an embodiment, policy unit 114 is further configured to retrieve one or more policies that allow determining various configurations that can be safely implemented on network device 110a and that, when implemented, would not cause a negative impact on the overall network performance. For example, policy unit 114 may retrieve a policy that can be used to determine configuration parameters and settings that are appropriate for network device 110a, and that, when implemented, would not cause a negative impact on other operations performed by network device 110a and the operations performed by other devices of network 100.

In an embodiment, policy unit 114 retrieves one or more polices from storage associated with network device 110a and/or from any storage included in network 110.

Policy unit 114 may select the one or more policies based on a type of network device 110a and/or based on the functions that network device 110a is configured to perform. For example, if network device 110a is a router, then a primary function of network device 110a is routing data packets from network device 110a to other devices in network 100. Hence, policy unit 114 may select and retrieve a particular policy that pertains to routing data by a router and to instrumenting and configuring a router in network 100.

In an embodiment, policy unit 114 is further configured to generate a network device health model for network device 110a. For purposes of this disclosure, a health model comprises stored data indicating the state and operability of a device, based on compiling data elements from a plurality of data sources relating to the device. The health model may be generated based on performance measurements collected for network device 110a and policies retrieved by policy unit 114.

The health model may include or be derived from information about the device's configuration, a list of the network device's components, operational status of the components, a list of features available on network device 110a, a list of the enabled features, a list of the disabled features, a list of non-operational features, a list of errors and problems persistent on network device 110a, and any other information that reflects the state and operability of network device 110a. Such additional information can be stored on the network device 110a, or other devices.

In an embodiment, policy unit 114 is further configured to determine utilization thresholds for network device 110a, and to determine a state of network device 110a and a health status of network device 110a. For example, policy unit 114 may determine recommended base-thresholds for various types of the device's performance measurements and compare actual values of the performance measurements with the base-thresholds.

An example measurement for a router is bandwidth of a particular link. By comparing the bandwidth information stored in a health model of network device 110a with an appropriate bandwidth base-threshold for a router, policy unit 114 may determine whether network device 110a is experiencing a bandwidth shortage at a particular moment.

In an embodiment, policy unit 114 is configured to determine whether network device 110a has sufficient processing resources to execute the operations that are currently scheduled for execution. Processing resources may include, for example, CPU load or amount of free memory. Policy unit 114 may make a determination of sufficient available processing resources based on performance measurements that have been collected by device health unit 112, health model construed for network device 110a, and/or based on any other information available to policy unit 114. For example, based on the performance measurements, policy unit 114 may determine whether network device 110a has sufficient CPU capacity or sufficient free memory to perform currently scheduled operations. In response to determining that the resources are insufficient to support the performance of the currently scheduled operations, policy unit 114 may update the health model or may generate a notification indicating a lack of sufficient resources, a notification indicating a configuration modification recommended for network device 110a, and/or a notification indicating any other message appropriate in such a situation.

In an embodiment, policy unit 114 is configured to determine whether network device 110a has sufficient processing resources to execute the operations that are scheduled to be executed in the feature. Policy unit 114 may make that determination based on the collected performance measurements and/or any other information available to policy unit 114. For example, policy unit 114 may determine that execution of DPI analysis of each data packet transmitted by network device 110a during high-volume data traffic hours may fail because CPU and memory resources during the high-volume period may be insufficient to support DPI analysis at that time.

In an embodiment, policy unit 114 is further configured to receive an indication of a change in quality of services provided by network device 110*a*. The indication may be received directly from a user interface unit 118 or indirectly from a system administrator, a program application, a user, or any other entity capable of communicating with network device 110*a*.

In an embodiment, policy unit 114 is further configured to determine one or more operations that can be safely performed on network device 110*a* and that can restore a quality of services provided by network device 110*a*. Policy unit 114 may make that determination based on the performance measurements data collected for network device 110*a*, a health model construed for network device 110*a*, base-thresholds determines for network device 110*a*, or any other information available to policy unit 114.

In an embodiment, policy unit 114 determines one or more operations to cause instrumentation or reconfiguration of network device 110*a*. Examples of the operations that policy unit 114 can determine comprise turning on a disabled feature on the network device for a particular period of time, turning off an enabled feature on the network device, enabling a network based application recognition capability, enabling DPI analysis, enabling a device configuration analysis, enabling an application execution monitoring capability, enabling communications support, enabling a port on the network device, disabling a port on the network device, and any other operations that network device 110*a* may be capable of performing.

Policy unit 114 may comprise a unit of trusted logic that can be used to determine whether an execution of a particular operation is safe. For example, using the trusted logic, policy unit 114 may determine whether an execution of the particular operation may negatively impact the primary functions of network device 110*a* and network 100.

In an embodiment, policy unit 114 may determine that one or more operations can be performed on network device 110*a* because an execution of the one or more operations will not negatively impact the performance of network device 110*a* and performance of network 100. For example, policy unit 114 may determine that due to inadequate availability of CPU power and memory, and a high volume of data traffic communicated via network device 110*a* at the present moment, DPI analysis of the communicated packets should be disabled to ensure maintaining the current level of services provided by network device 110*a*.

According to another example, policy unit 114 may determine that due to abundance of CPU power and memory, and a low value of data traffic communicated via network device 110*a* at the present moment, DPI analysis of the communicated packets could be enabled because it will not negatively impact the current level of services provided by network device 110*a*.

In an embodiment, policy unit 114 is configured to communicate one or more operations to configuration unit 116.

Referring again to configuration unit 116, in an embodiment, configuration unit 116 is further configured to execute the received operations to instrument network device 110*a* and to modify a current configuration of network device 110*a*. For example, configuration unit 116 may receive from policy unit 114 a request to disable a DPI analysis of data packets transmitted via network device 110*a* because of limited availability of CPU power and memory, and because the current volume of data traffic communicated by network device 110*a* is exceeding a predefined base-threshold. Upon receiving such a request, configuration unit 116 may automatically disable the DPI analysis feature on network device 110*a*. From that moment and until the instructions to the contrary are received, the DPI analysis is not performed on the data packets communicated via network device 110*a*.

In an embodiment, configuration unit 116 executes the received operations automatically and without following a conventional, time-consuming process of requesting an approval from a supervising team or postponing an execution of any of the operations until the approval is received.

In an embodiment, the presented approach may change the conventional procedures associated with configuring and reconfiguring network devices in a network deployed into production. In an embodiment, configuration unit 116 receives a request to execute the operations that are safe for execution on network device 110*a* because the operations were determined as not causing any negative impact on the functionalities of network device 110*a* and network 100. Optionally, that can be executed at a management level. Therefore, an execution of the recommended operations does not have to be reviewed. Consequently, network device 110*a* may be reconfigured without the delay.

In an embodiment, a user interface unit 118 is configured to cause displaying a graphical user interface on network device 110*a*. Optionally, displaying of the graphical user interface may be performed at the manager level. The graphical user interface may comprise various panels. The panels may be used to display performance measurements collected for network device 110*a*, recommended operation for instrumentation or reconfiguration of network device 110*a*, and/or any other information useful to a user of network device 110*a*.

In an embodiment, user interface unit 118 is configured to display a graphical user interface that comprises an indicator of whether network device 110*a* has sufficient processing resources available to perform one or more operations scheduled to be performed at a particular moment. For example, the graphical user interface may comprise a panel that indicates the current CPU resources, memory resources, bandwidth, and information about other resources that the operations executed on network device 110*a* may need. Examples of the graphical user interface are described in reference to FIG. 4.

Figure 2:
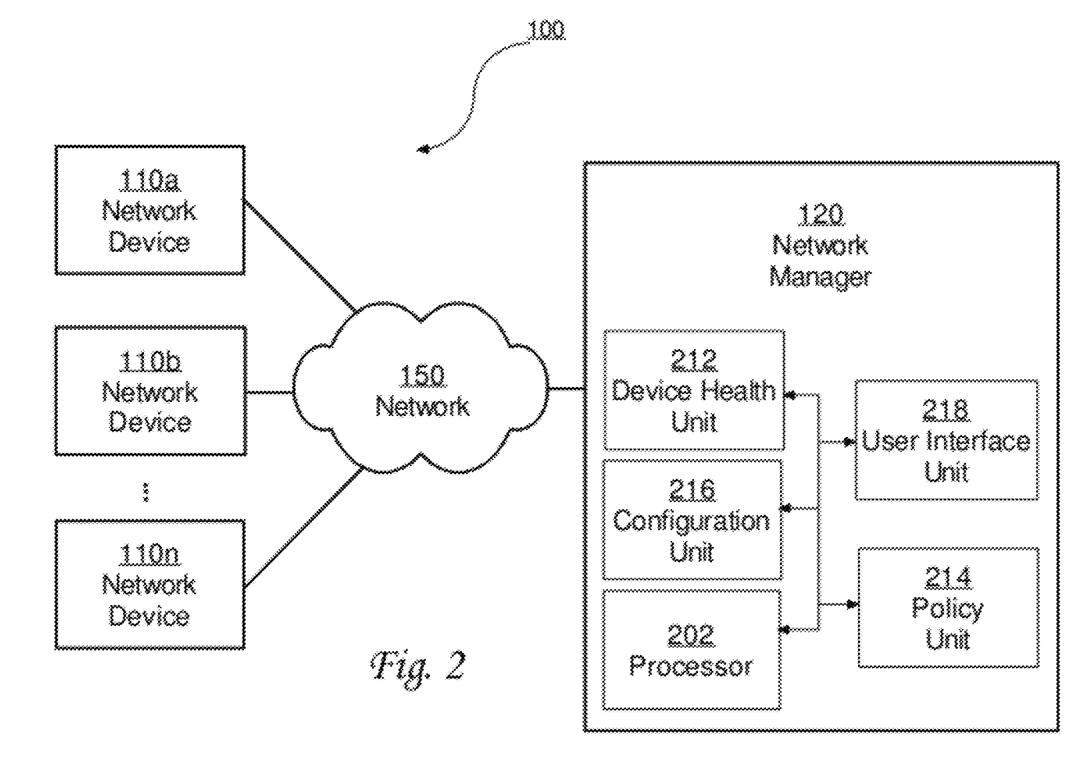
FIG. 2 illustrates an embodiment of a network manager configuring one or more network devices.

FIG. 2 illustrates an embodiment of a network manager device 120 configuring one or more network devices 110*a*, 110*b* through 110*n* in a network 100. In an embodiment as shown in FIG. 2, network device 110*a* is instrumented or reconfigured by network manager 120.

In an embodiment, network manager device 120 (network manager 120) comprises a processor 202, a device health unit 212, a policy unit 214, a configuration unit 216 and a user interface unit 218.

For purposes of illustrating clear examples, FIG. 2 shows that network manager 120 comprises one processor 202, one device health unit 212, one policy unit 214, one configuration unit 216 and one user interface unit 218. However, in practical embodiments, network manager 120 may comprise one or more processors 202, one or more device health units 212, one or more policy units 214, one or more configuration units 216 and one or more user interface units 218.

In an embodiment, a processor 202 facilitates communications between units of network manager 120, processes commands received by and executed on network manager 120, processes responses received by network manager 120, and facilitates various types of operations executed by network manager 120. Processor 202 comprises hardware and software logic configured to execute various processes on network manager 120.

In an embodiment, a device health unit 212 is configured to collect one or more performance measurements of any of network devices 110a, 110b through 110n. In the description below, references are made to device health unit 212 collecting performance measurements for network device 110a; however, device health unit 212 may collect performance measurements of any of network devices present in network 100.

In an embodiment, device health unit 212 performs the same functions as device health unit 112, described above, and can be characterized as configured in the same way as device health unit 112, except that device health unit 212 resides at network manager device 120.

In an embodiment, policy unit 214 retrieves one or more polices from storage associated with network device 110a and/or from any storage included in network 110. In the description below, references are made to network device 110a; however, policy unit 214 may retrieve the policies for any of network devices present in network 100.

In an embodiment, policy unit 214 performs the same functions as policy unit 114 described above, and can be characterized as configured in the same way as policy unit 114, with the exception that policy unit 214 resides at network manager device 120.

In an embodiment, configuration unit 216 is configured to collect and store configuration information of network device 110a. In the description below, references are made to network device 110a; however, configuration unit 216 may collect and store configuration information of any of network devices present in network 100.

In an embodiment, configuration unit 216 performs the same functions as configuration unit 116 described above, and can be characterized as configured in the same way as configuration unit 116, with the exception that configuration unit 216 resides at network manager device 120.

In an embodiment, a user interface unit 218 is configured to cause displaying a graphical user interface on network device 110a. In the description below, references are made to network device 110a; however, user interface unit 218 may display graphical user interfaces for any network devices present in network 100.

In an embodiment, user interface unit 218 performs the same functions as user interface unit 118 described above, and can be characterized as configured in the same way as user interface unit 118 is configured, with the exception that user interface unit 218 resides at network manager device 120.

3.0 Configuring a Network Device Using Health and Utilization Measurements

In an embodiment a process allows leveraging performance measurements pertaining to a device's health and utilization to automatically determine one or more adjustments to the device's configuration to resolve problems persistent on the device.

Figure 3:
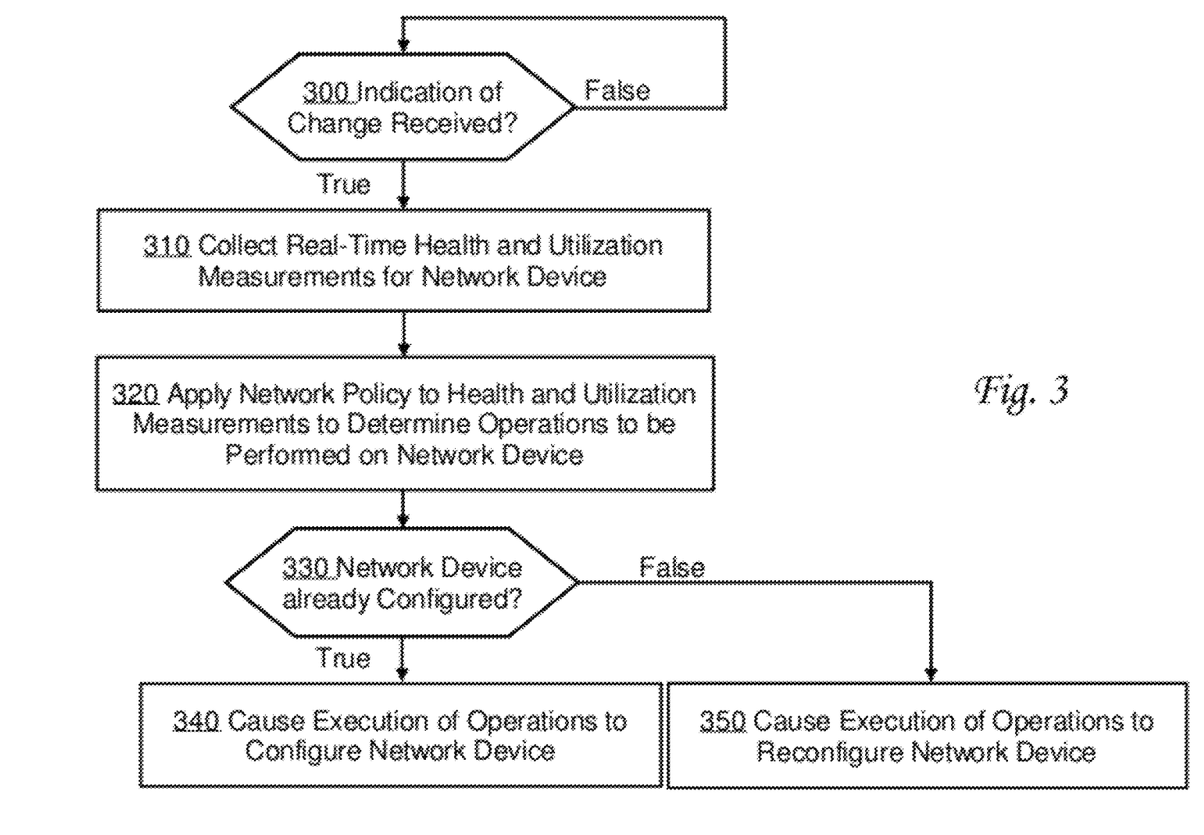
FIG. 3 illustrates a flow chart of an embodiment of configuring a network device.

FIG. 3 illustrates a flow chart of an embodiment of configuring a network device.

In an embodiment, FIG. 3 may be performed by network device as a part of self-configuration process performed by a network device such as network device 110a, as described in FIG. 1. The steps depicted in FIG. 3 may be performed by components of network device 110a, including a processor 102, a device health unit 112, a policy unit 114, a configuration unit 116 and one user interface unit 118.

In an embodiment, the steps depicted in FIG. 3 may be performed by a network managing device 120 when the network managing device instruments or reconfigures another network device, such as network device 110a, as described in FIG. 2. The steps depicted in FIG. 3 may be performed by components of managing device 120, including a processor 202, a device health unit 212, a policy unit 214, a configuration unit 216 and a user interface unit 218.

In an embodiment, in step 300, a device health unit of either a network device (as depicted in FIG. 1) or a network manager 120 (as depicted in FIG. 2) tests whether an indication of a change in quality of services provided by the network device has been received.

The indication may point to a positive change in the quality of services provided by the network device, or may point to a negative change in the quality of services. For example, if the current volume of data traffic communicated via the network device has been increasing and reached a level that is above a predefined base-threshold, then the change is negative. On the other hand, if the current volume of data traffic communicated via the network device has been decreasing and reached a level that is below the predefined base-threshold, then the change is positive.

In an embodiment, regardless of whether a change is positive or negative, one or more operations, such as enabling or disabling some optional features that would provide a desirable response to the change, are determined.

In an embodiment, an indication of a change in quality of services may be received from various sources. For example, the indication may be received from a system administrator, a program application or a user, and may be conveyed as an input entered to a graphical user interface, or in any other form.

In response to determining that an indication of a change in quality of services provided by a network device has not been received, the process continues testing for the indication in step 300 until such an indication is received or until the waiting process is in any manner interrupted.

In response to determining that an indication of a change in quality of services provided by a network device has been received, the process proceeds to executing step 310

In step 310, health and utilization measurements for the network device are collected. The measurements information may be collected from various sources of information and from various data storage.

The measurements information may include performance measurements of the network device, the device's health and utilization measurements, central processing unit (CPU) utilization status, memory utilization status, bandwidth status, load of the network device, a list of applications executed on the network device, an application response time, a link fault, a port fault, information communicated by an applications launched on the network device, information communicated in data packets send from and to the network device, and any other information that can be used to characterize a status and state of the network device. The collected health and utilization measurements for the network device are sent to a policy unit.

In step 320, the process retrieves device policies and network polices from storage and applies the policies to the health and utilization measurements to determine one or more operations and configurations that can safely be performed on the network device, and which, once performed, can restore the quality of services provided by the network device. For example, a policy unit of either a network device (as depicted in FIG. 1) or a network manager 120 (as depicted in FIG. 2) can perform the retrieving.

In an embodiment, the policies may be selected based on a type and function of the network device, and/or based on any instructions provided to the policy unit.

In step 320, the process generates a network device health model for the network device and adds the device health model to a configuration of the network device.

In an embodiment, the operations determined in step 320 may include turning on a disabled feature on the network device for a particular period of time, turning off an enabled feature on the network device, enabling a network based application recognition capability, enabling DPI analysis, enabling a device configuration analysis, enabling an application execution monitoring capability, enabling communications support, enabling a port on the network device, disabling a port on the network device.

In step 320, based on the performance measurements, the process may also determine whether the network device has sufficient processing resources then-currently available to execute one or more operations on the network device. For example, various utilization thresholds for the network device may be determined and used to determine whether one or more operations may be performed without exceeding the respective thresholds at the network device. For purposes of illustrating a clear example, in an embodiment the term then currently means at or near the time that step 320 is performed.

In step 330, the process determines whether the network device has been already configured.

In step 340, in response to determining that the network device has been already configured, the process causes the already determined operations to be executed on the network device to perform instrumentation of the network device. For example, the policy unit may send the instructions to a configuration unit to configure the network device. For instance, the policy unit may send the instructions to disable a certain features on the network device that should restore the quality of services provided by the network device.

In response to determining that the network device has not been yet configured, control transfers to step 350, in which the process causes the already determined operations to be executed on the network device to perform reconfiguration of the network devices. For example, if the network device has been already configured and deployed into production and a DPI analysis of transmitted data packets was enabled on the network devices, then the policy unit may send the instructions to a configuration unit to disable the DPI analysis to restore the quality of services provided by the network device.

In an embodiment, the process of selecting one or more operations to be executed to configure or reconfigure a network device may be monitored via a graphical user interface displayed on the network device or a network management unit. For example, performance measurements of the device's health and utilization may be displayed in various panels of the graphical user interface. The graphical user interface may comprise an indicator of whether the network device has sufficient processing resources available to perform the one or more operations.

The graphical user interface may also comprise one or more graphical user interface widgets to display one or more operations that can be executed on the network device to restore the quality of services provided by the network device. Furthermore, the graphical user interface may comprise a display of any additional operations that are currently executed on the network device, a display of various indicators, widgets, notifications, error messages and other information useful for configuration and reconfiguration of the network device.

4.0 Graphical User Interface Example

Figure 4:
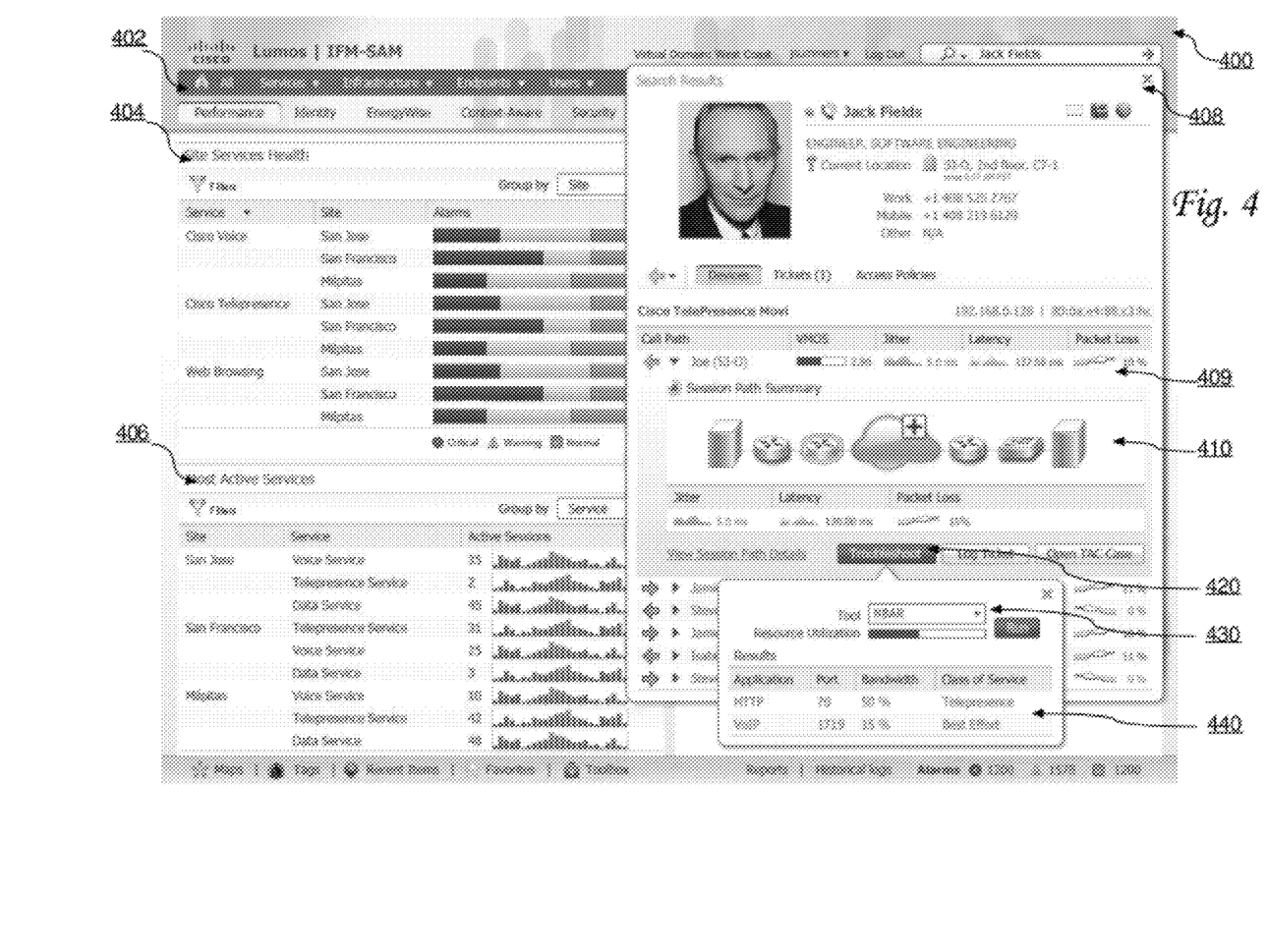
FIG. 4 illustrates a use case of an embodiment of configuring a network device.

FIG. 4 illustrates an example graphical user interface in one embodiment of configuring a network device. In particular, FIG. 4 depicts a snapshot of an embodiment of a graphical user interface (GUI) 400 that a system administrator may use to navigate while configuring or reconfiguring a network device using the device's health and utilization measurements. The depicted embodiment illustrates a hypothetical example situation in which a system administrator attempts to solve a problem with one of the active communications sessions established on the network device. While the embodiment depicted in FIG. 4 refers to solving the problem with the active session, the embodiments of solving other problems are foreseeable.

In an embodiment, a graphical user interface (GUI) 400 comprises several panels for displaying various types of information. For example, GUI 400 comprises a Header Panel 402 that includes hot links to all options, services, infrastructure elements, endpoints, users, etc., and pull-out menus for performance options, identity options, Energy-Wise applications, Context-Aware options, security options and other options, not necessarily depicted in FIG. 4, but also available to a network administrator.

In an embodiment, GUI 400 may also comprise a Site services Health Panel 404 for displaying various information related to Cisco Voice application, Cisco TelePresence application, Web-Browsing application and other applications executed by devices in the network.

In an embodiment, GUI 400 may also comprise a Most Active Services Panel 406 for displaying logical or physical locations of data centers, hubs and other communications node that experience a relatively heavily traffic at a particular across their various application based services In an embodiment, GUI 400 may also comprise a Search Results Panel 408 for displaying a user profile of a user, who for example submitted a service request to the network administrator. The Search Results Panel 408 may comprise a Call Path subpanel that includes a Session Path Summary 410 for a particular communications session, described below.

In an embodiment, Search Results Panel 408 may also comprise one or more pull-out menus, which when selected provide additional views, graphs and information about the particular network device. For example, Search Results Panel 408 may comprise a Troubleshoot pull-out menu 420, which when selected by the network administrator, expands to a NBAR tool 430, described below.

In an embodiment, a network administrator receives a service request call or an email from a user working in a network. The user provides identification information in the service call request, by providing a name, employee's identification or any other type of information that the network administrator may use to retrieve the user's profile from a database.

In an embodiment, a network administrator searches for the user's profile and in response to the search, receives a Search Results 408, as depicted in FIG. 4. The Search Results 408 is a user profile comprising the user's photographs, name, title, organization and locations, contact information and other information related to the user.

In an embodiment, the service request call also provides an indication that there is a problem with one of the active sessions established by the user. For example, the indication may show that there is a degradation of quality of communications services provided by the particular active session. For instance, a significant number of packets communicated within the particular active session have been dropped.

In an embodiment, upon displaying a Search Results Panel 408, a network administrator tries to identify the particular communications session that causes problems reported in the user's service request call.

In an embodiment, a system administrator may identify one of the paths that are established between the user who reported problems and another user. An example of such a path is depicted as a path 409 in FIG. 4.

In an embodiment, using GUI 400, a system administrator may request a contextual service path analysis for the path 409. For example, the system administrator may select a pull-down menu for a Session Path discover and launch a Discover Path application to receive a Session Path Summary 410. By launching the Call Path application, the system administrator requests the contextual service path analysis to find out whether the path 409, established between the user and Joe is experiencing some problems.

In response to the network administrator requesting contextual service path analysis, GUI 400 displays a Session Path Summary 410, as depicted in FIG. 4. Session path summary 410 may depict the nodes, routers and other devices that are included in the path. Furthermore, Session Path Summary 410 may provide information about a jitter, a packet latency, packet loss, and other information related to the path's characteristics.

In an embodiment, a contextual service path analysis for a selected path 409 involves performing DPI analysis of data packets communicated between the user's device and Joe's device. For example, once the devices experiencing a packet loss are determined, the paths that potentially experience packet losses are determined and the possible reasons for the packet losses are determined.

In an embodiment, a network administrator analyses the display provided in a Session Path Summary 410 and concludes that further troubleshooting may be required. To continue with the troubleshooting, using GUI 400, the network administrator launches a troubleshooting application by selecting a Troubleshoot pull-out menu 420.

In an embodiment, a network troubleshooting application is executed. The network troubleshooting application may perform one or more steps described with reference to FIG. 3. For example, the network troubleshooting collects the health and utilization measurements of the user's network device and the user's path connecting the user and another user. Furthermore, the network troubleshooting application may determine one or more operations that can safely be performed on the user's network device to restore the quality of the services provided to the user.

In an embodiment, the network troubleshooting application determines whether the particular network device has sufficient capacity to run some additional tests, and whether running those tests would negatively impact basics functionality of the particular network device.

In an embodiment, the network troubleshooting application detects that a Network Based Application Recognition (NBAR) application is available to further troubleshoot the problem. The availability of the NBAR application is indicated in panel NBAR 430 of FIG. 4.

NBAR allows an intelligent identification and classification of mission critical applications, such as Enterprise Resource Planning (ERP) applications and workforce optimization application. Once the mission critical applications are classified, the applications can be guaranteed a minimum amount of bandwidth, and may receive a preferential treatment. Non-critical applications, such as for example Internet gaming applications and MP3 file sharing applications can also be classified using NBAR and marked for best effort service or blocked if that is necessary.

In an embodiment, a network administrator selects a troubleshooting option 420, which starts NBAR tool 430 to identify critical applications that utilize the path 409 identified in a Session Path Summary 410.

In an embodiment, using NBAR tool 430, the network administrator determines the applications that utilize the path 409 identified in a Session Path Summary 410. In the example depicted in FIG. 4, in a panel 440, the NBAR tool 430 displays information about detects two applications: HTTP application and Voice Over IP (VoIP) application. The HTTP application has an associated TelePresence class of service, and the VoIP application has associated Best Efforts class of service.

In an embodiment, the network administrator suspects that the source of problems is related to an error in associating classes of services to the HTTP application and VoIP application. The network administrator suspects that the HTTP application should have associated the Best Efforts class of service, and the VoIP application should have associated the TelePresence class of service. By associating the TelePresence class of service to the VoIP application, and the Best Efforts class of service to the HTTP application, the VoIP application will receive a preferential treatment of the HTTP application, and thus the quality of services provided to the user may improve.

In an embodiment, to resolve the problem reported by the user, a network administrator logs a ticket, or opens a TAC case to have the system automatically address the wrong class configuration. In response to the network administrator's request, the system would determine whether reassignment of the class of service for the above mentioned application is possible and whether such a reassignment may have any negative impact on other processes and devices in the network.

By using the approach illustrated in FIG. 4, the network administrator was able to pinpoint the nature of the problem and provide a detailed request for the system's reconfiguration. For example, instead of indicating that there is an unknown problem with a particular network device, the network administrator was able to obtain a session path summary for a particular path, determine the applications using the particular session path, and obtain enough information to suspect that a particular association between one of the applications and their classes of service may be inappropriate. For instance, if the network administrator knows that a VoIP application as being sensitive to packet's latency, then the VoIP application should have a TelePresence class of service, not a Best Efforts class of service. Thus, the network administrator can easily pinpoint that the problem is with the class of service Best Efforts associated with the VoIP application, and the system may determine whether such a modification is appropriate.

In an embodiment, a network administrator has access to up-to-date health and utilization measurements of a network device, and thus, based on the up-to-date health and utilization measurements of the network device, the network administrator can provide details about the problem. By accessing rich performance measurements, alerts and analytical data, the network administrator can quickly isolate the problem.

In an embodiment, by collecting information and analyzing the collected information displayed in a concise and legible manner, a network administrator can control automation of advanced troubleshooting of devices in a network. By relying on the up-to-date health and utilization measurements data for a network device, the network administrator may determine a source of device's problem without need to probe individual device and connections.

In an embodiment, a service request call includes rich performance data and links that that a network administrator followed as he was troubleshooting a network device. By including the rich performance data and the links, the network administrator provided all necessary information for the system to determine whether the proposed solution is appropriate.

In an embodiment, a service request call is directed to a Technical Assistance Center (TAC) for review and performing the requested tasks. The TAC case and attached performance data are analyzed to determine the requested tasks. For example, a TAC technician may use a testing console to view the associations between the applications and classes of services for the applications executed on a particular device and can chance the class configuration. For instance, the TAC technician may solve the class configuration problem by upgrading the class of service for a VoIP application. The technician may notice that because the VoIP application has presently associated a Best Efforts class of service, the VoIP application is experiencing packet loss since the Best Efforts class of service is inferior to actually required class of service for the VoIP communications. Hence, the technician may upgrade the service provider class of service for the VoIP application.

Referring again to FIG. 4, from the information included in a panel 440, the technician may notice that an HTTP application contributes to about 50% of the traffic and that the traffic is sent and received on a non-standard port 70. The technician may know that by default a Wide Area Application Services (WAAS) solution deployed in that particular branch expects the HTTP application to use port 80, not port 70, and that the WAAS solution does not optimize the traffic generated and received by the HTTP application traffic if the HTTP application does not use port 80. To solve that problem, the technician may add port 70 to the WAAS solution and to the WAAS express policy, and thus allow optimization of the communications managed by the HTTP application on the particular network device. After adding the port 70 to the WAAS solution and to the WAAS express policy, the application traffic may be reduced from 50% (as indicated in information about two applications 540) to 10%.

In an embodiment, the up-to-date health and utilization data of a network device are used to reconfigure or configure a network device by performing simple modifications to the settings and configuration of the network device. The simple modifications provide means for solving problems indicated to a network administrator in an efficient and inexpensive way. For example, the reconfiguration of the network device as presented here allows avoiding sending a request to manually troubleshoot the user's device. Furthermore, the reconfiguration of the network device as presented here does not require requesting an expensive service upgrade from a Service Provider (SP) Internet plan.

In an embodiment, a technician leveraged the available instrumentation to save expenses and operational costs that otherwise would have been required to perform additional probing of the network device.

In an embodiment, the described approach allowed a network administrator and the technician to save a great deal of time for verbally communicating with each other, communicating to each other their troubleshooting ideas, troubleshooting strategy and troubleshooting findings.

In an embodiment, the described approach may reduce at least some human errors that otherwise could have been made during the process of explaining the problem, exchanging findings between a user, a network administrator and a technician, and troubleshooting of the user device's problem. In some cases the network device's problems may be resolved with a higher level of satisfaction and during a relatively short period of time.

5.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
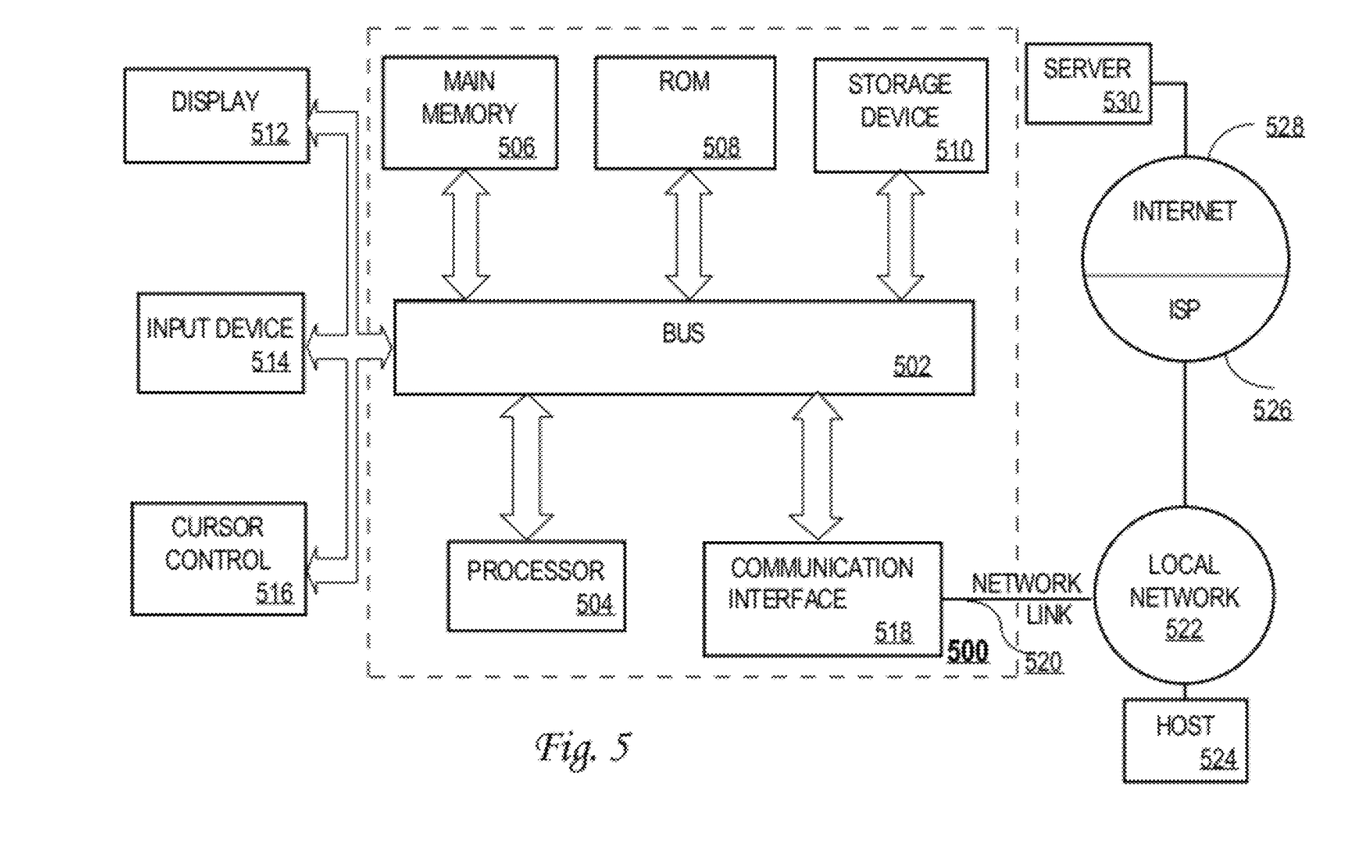
FIG. 5 illustrates an embodiment of communications between network devices in a network.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (LCD, CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term storage media as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the Internet 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A data processing method, comprising:
   in response to receiving an indication of a change in quality of services provided by a network device, collecting one or more performance measurements of the network device;
   by applying a network policy to the measurements, determining one or more operations capable of performing on the network device to enhance the quality of services;
   in response to determining that the network device is not configured for instrumentation to execute the one or more operations, causing automatic self-configuration of the network device to enable execution of the one or more operations on the network device to enhance the quality of services provided by the network device, the operations comprising one or more of: enabling a deep packet inspection (DPI) analysis on the network device, disabling the DPI analysis, enabling a network based application recognition (NBAR) capability, disabling the NBAR capability, enabling a device configuration analysis (DCA), disabling the DCA, enabling an application execution monitoring (AEM) capability, disabling the AEM capability, enabling a network communication support (NCS), or disabling the NCS;
   wherein the execution of the one or more operations on the network device causes modifying, by the network device, a type of a quality of services class assigned to a particular application executed on the network device;
   wherein the method is performed by one or more computing devices.

2. The method of claim 1, further comprising generating a network device health model and adding the device health model to a configuration of the network device, and selecting the network policy based on a type and function of the network device.

3. The method of claim 1, further comprising determining, based on the performance measurements, whether the network device has sufficient processing resources then-currently available to execute the one or more operations;
   wherein the performance measurements of the network device comprise health and utilization measurements, including any of: central processing unit (CPU) utilization status, memory utilization status, bandwidth status, load of the network device, a list of applications executed on the network device, an application response time, a link fault, a port fault, information communicated by applications launched on the network device, or information communicated in data packets sent from and to the network device.

4. The method of claim 1, wherein the indication of a change in quality of services is received from a system administrator, a program application or a user.

5. The method of claim 1, further comprising using a policy unit of the network device and a performance agent that specifies utilization thresholds for the network device to determine the one or more operations;
   wherein the one or more operations comprise any of the following: turning on a disabled feature on the network device for a particular period of time, turning off an enabled feature on the network device, enabling communications support, enabling a port on the network device, disabling a port on the network device.

6. The method of claim 1, further comprising using a trusted logic that is embedded in a network management module to determine the one or more operations.

7. The method of claim 1, further comprising:
   causing displaying, based, at least in part, on the measurements, a graphical user interface that comprises an indicator of whether the network device then-currently has sufficient processing resources available to perform the one or more operations, and comprises one or more graphical user interface widgets that identify the one or more operations;
   receiving user input requesting activation of the one or more operations.

8. An internetworking device, comprising:
   one or more processors;
   a device health unit coupled to the one or more processors and configured to perform, in response to receiving an indication of a change in quality of services provided by a network device, collecting one or more performance measurements of the network device;
   a policy unit configured to perform, by applying a network policy to the measurements, determining one or more operations capable of performing on the network device to enhance the quality of services;
   an automatic self-configuration unit configured to perform, in response to determining that the network device is not configured for instrumentation to execute the one or more operations, causing automatic self-configuration of the network device to enable execution of the one or more operations on the network device to enhance the quality of services provided by the network device, the operations comprising one or more of: enabling a deep packet inspection (DPI) analysis on the network device, disabling the DPI analysis, enabling a network based application recognition (NBAR) capability, disabling the NBAR capability, enabling a device configuration analysis (DCA), disabling the DCA, enabling an application execution monitoring (AEM) capability, disabling the AEM capability, enabling a network communication support (NCS), or disabling the NCS;
   wherein the execution of the one or more operations on the network device causes modifying, by the network device, a type of a quality of services class assigned to a particular application executed on the network device.

9. The internetworking device of claim 8, wherein the policy unit is further configured to perform generating a network device health model and adding the device health model to a configuration of the network device, and selecting the network policy based on a type and function of the network device.

10. The internetworking device of claim 8, wherein the policy unit is further configured to perform determining, based on the performance measurements, whether the network device has sufficient processing resources then-currently available to execute the one or more operations;
    wherein the performance measurements of the network device comprise health and utilization measurements, including any of: central processing unit (CPU) utilization status, memory utilization status, bandwidth status, load of the network device, a list of applications executed on the network device, an application response time, a link fault, a port fault, information communicated by applications launched on the network device, or information communicated in data packets sent from and to the network device.

11. The internetworking device of claim 8, wherein the indication of a change in quality of services is received from a system administrator, a program application or a user.

12. The internetworking device of claim 8, wherein the policy unit is part of the network device and utilizes a performance agent that specifies utilization thresholds for the network device to determine the one or more operations;
    wherein the one or more operations comprise any of the following: turning on a disabled feature on the network device for a particular period of time, turning off an enabled feature on the network device, enabling communications support, enabling a port on the network device, disabling a port on the network device.

13. The internetworking device of claim 8, wherein the policy unit is part of a trusted logic that is embedded in a network management module to determine the one or more operations.

14. The internetworking device of claim 8, further comprising a user interface unit configured to perform:
    causing displaying, based, at least in part, on the measurements, a graphical user interface that comprises an indicator of whether the network device then-currently has sufficient processing resources available to perform the one or more operations, and comprises one or more graphical user interface widgets that identify the one or more operations;
    receiving user input requesting activation of the one or more operations.

15. A non-transitory computer-readable storage medium storing one or more sequences of instructions which, when executed by one or more processors, cause the one or more processors to perform:
    in response to receiving an indication of a change in quality of services provided by a network device, collecting one or more performance measurements of the network device;
    by applying a network policy to the measurements, determining one or more operations capable of performing on the network device to enhance the quality of services;
    in response to determining that the network device is not configured to execute the one or more operations, causing automatic self-configuration of the network device to enable execution of and execute the one or more operations on the network device to enhance the quality of services provided by the network device, the operations comprising one or more of: enabling a deep packet inspection (DPI) analysis on the network device, disabling the DPI analysis, enabling a network based application recognition (NBAR) capability, disabling the NBAR capability, enabling a device configuration analysis (DCA), disabling the DCA, enabling an application execution monitoring (AEM) capability, disabling the AEM capability, enabling a network communication support (NCS), or disabling the NCS;

wherein the execution of the one or more operations on the network device causes modifying, by the network device, a type of a quality of services class assigned to a particular application executed on the network device.

16. The non-transitory computer-readable storage medium of claim 15, further storing instructions which, when executed, cause the one or more processors to perform:

generating a network device health model and adding the device health model to a configuration of the network device, and selecting the network policy based on a type and function of the network device.

17. The non-transitory computer-readable storage medium of claim 15, further storing instructions which, when executed, cause the one or more processors to perform:

determining, based on the performance measurements, whether the network device has sufficient processing resources then-currently available to execute the one or more operations;

wherein the performance measurements of the network device comprise health and utilization measurements, including any of: central processing unit (CPU) utilization status, memory utilization status, bandwidth status, load of the network device, a list of applications executed on the network device, an application response time, a link fault, a port fault, information communicated by applications launched on the network device, or information communicated in data packets sent from and to the network device.

18. The non-transitory computer-readable storage medium of claim 15, wherein the indication of a change in quality of services is received from a system administrator, a program application or a user.

19. The non-transitory computer-readable storage medium of claim 15, further storing instructions which, when executed, cause the one or more processors to perform:

using a policy unit of the network device and a performance agent that specifies utilization thresholds for the network device to determine the one or more operations;

wherein the one or more operations comprise any of the following: turning on a disabled feature on the network device for a particular period of time, turning off an enabled feature on the network device, enabling communications support, enabling a port on the network device, disabling a port on the network device.

20. The non-transitory computer-readable storage medium of claim 15, further storing instructions which, when executed, cause the one or more processors to perform:

using a trusted logic that is embedded in a network management module to determine the one or more operations;

causing displaying, based, at least in part, on the measurements, a graphical user interface that comprises an indicator of whether the network device then-currently has sufficient processing resources available to perform the one or more operations, and comprises one or more graphical user interface widgets that identify the one or more operations;

receiving user input requesting activation of the one or more operations.

* * * * *